US006894448B2

(12) United States Patent
Bell

(10) Patent No.: US 6,894,448 B2
(45) Date of Patent: May 17, 2005

(54) DIRECT CURRENT MOTOR CONDITION MONITORING AND EXERCISING SYSTEM

(75) Inventor: Joseph A. Bell, Markle, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 19 days.

(21) Appl. No.: 10/630,651

(22) Filed: Jul. 30, 2003

(65) Prior Publication Data

US 2005/0001566 A1 Jan. 6, 2005

Related U.S. Application Data

(60) Provisional application No. 60/477,908, filed on Jun. 12, 2003.

(51) Int. Cl.[7] .................................................. H04Q 9/00

(52) U.S. Cl. ........................... 318/16; 318/434; 701/48; 701/33; 239/1; 239/61; 417/18

(58) Field of Search .......................... 318/16, 139, 245, 318/434; 701/1, 33, 50; 340/438; 123/179.2; 239/1, 71; 388/903; 361/24, 94; 417/18, 45; 182/2, 148

(56) References Cited

U.S. PATENT DOCUMENTS 3,576,485 A * 4/1971 Coons et al. ............... 318/434
3,774,217 A * 11/1973 Bonner et al. ......... 340/825.21
4,187,927 A * 2/1980 Byrne ........................ 182/2.9
4,762,199 A * 8/1988 Holmes ...................... 182/2.9
5,076,761 A * 12/1991 Krohn et al. ................ 417/18
5,773,945 A * 6/1998 Kim et al. .................. 318/434
5,801,503 A * 9/1998 Kim et al. .................. 318/434
5,904,296 A * 5/1999 Doherty et al. ............... 239/61
5,911,362 A * 6/1999 Wood et al. .................... 239/1
6,405,114 B1 * 6/2002 Priestley et al. .............. 701/50
6,421,593 B1 * 7/2002 Kempen et al. .............. 701/48
6,553,290 B1 * 4/2003 Pillar .......................... 701/33
6,789,519 B1 * 9/2004 Bell ........................ 123/179.2
2003/0195680 A1 * 10/2003 Pillar .......................... 701/33
2003/0200015 A1 * 10/2003 Pillar .......................... 701/33
2004/0039510 A1 * 2/2004 Archer et al. ................. 701/48
2004/0199302 A1 * 10/2004 Pillar et al. .................... 701/1

* cited by examiner

*Primary Examiner*—Paul Ip
(74) *Attorney, Agent, or Firm*—Jeffrey P. Calfa; Dennis Kelly Sullivan; Susan L. Lukasik

(57) ABSTRACT

Hydraulically actuated aerial lift trucks typically have a primary hydraulic pump system driven by the vehicle's engine and a backup pump system driven by a direct current motor. Due to infrequent use of such motors, they are vulnerable to failure due to corrosion of the brush/commutator interface or seizing of the motor bearings. A remote power unit is provided to periodically run the back up motor for brief periods to maintain the motor in running condition. Voltage levels across the motor terminals are monitored for correspondence to failure indicating levels.

15 Claims, 4 Drawing Sheets

DIRECT CURRENT MOTOR CONDITION MONITORING AND EXERCISING SYSTEM

REFERENCE TO RELATED APPLICATION

This application claims the benefit of U.S. Provisional Application 60/477,908 filed Jun. 12, 2003.

BACKGROUND OF THE INVENTION

1. Technical Field

The invention relates to the control and monitoring of electric motors and more particularly to a system providing exercising of and failure indicating for a direct current motor.

2. Description of the Problem

Utility vehicles are often advantageously supplied with auxiliary equipment, the operation of which is supported by the vehicle. Such auxiliary equipment can include hydraulically powered, aerial lift platforms as are often used for the repair of electrical power distribution lines. Typically, a hydraulic lift platform will be driven by a primary pump which is in turn driven by the vehicle's engine. In some applications, a back up hydraulic system is provided having a pump powered by a direct current motor energized by the vehicle's battery.

Back up direct current motors fail more often than they should due to harsh,operating environments and infrequent use. Failures of the motors can stem from corrosion between the motor brushes and commutator or from motor bearings seizing. It would be desirable to provide operators of utility vehicles indication of the status of these motors and improve the reliability by limiting the problems caused by lack of regular use.

SUMMARY OF THE INVENTION

According to the invention there is provided a motor vehicle having an engine and a direct current electrical power system. Vehicle accessory control is provided by a first controller area network including a remote power module. The remote power module includes a three state input and a control signal output. A direct current motor is connectable to the direct current electrical system for energization. A motor control switch connected by one terminal to the direct current electrical power system provides the usual method for energizing the direct current motor through the agency of an energization relay. This energization relay is exploited to provide for automated testing and exercise of the motor by the remote power module. The energization relay has an input terminal connected both to the control signal output of the remote power module and to a second terminal for the motor control switch. The power output terminal for the relay is connected to the direct current motor and to the three state input of the remote power module. Voltage levels appearing on the three state input (which is biased to first elevated voltage) indicate normal operation or failure. Periodic, momentary application of a control signal by the remote power module exercises the motor to prevent bearing seizure and to clean brushes and commutators.

Additional effects, features and advantages will be apparent in the written description that follows.

BRIEF DESCRIPTION OF THE DRAWINGS

The novel features believed characteristic of the invention,,are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
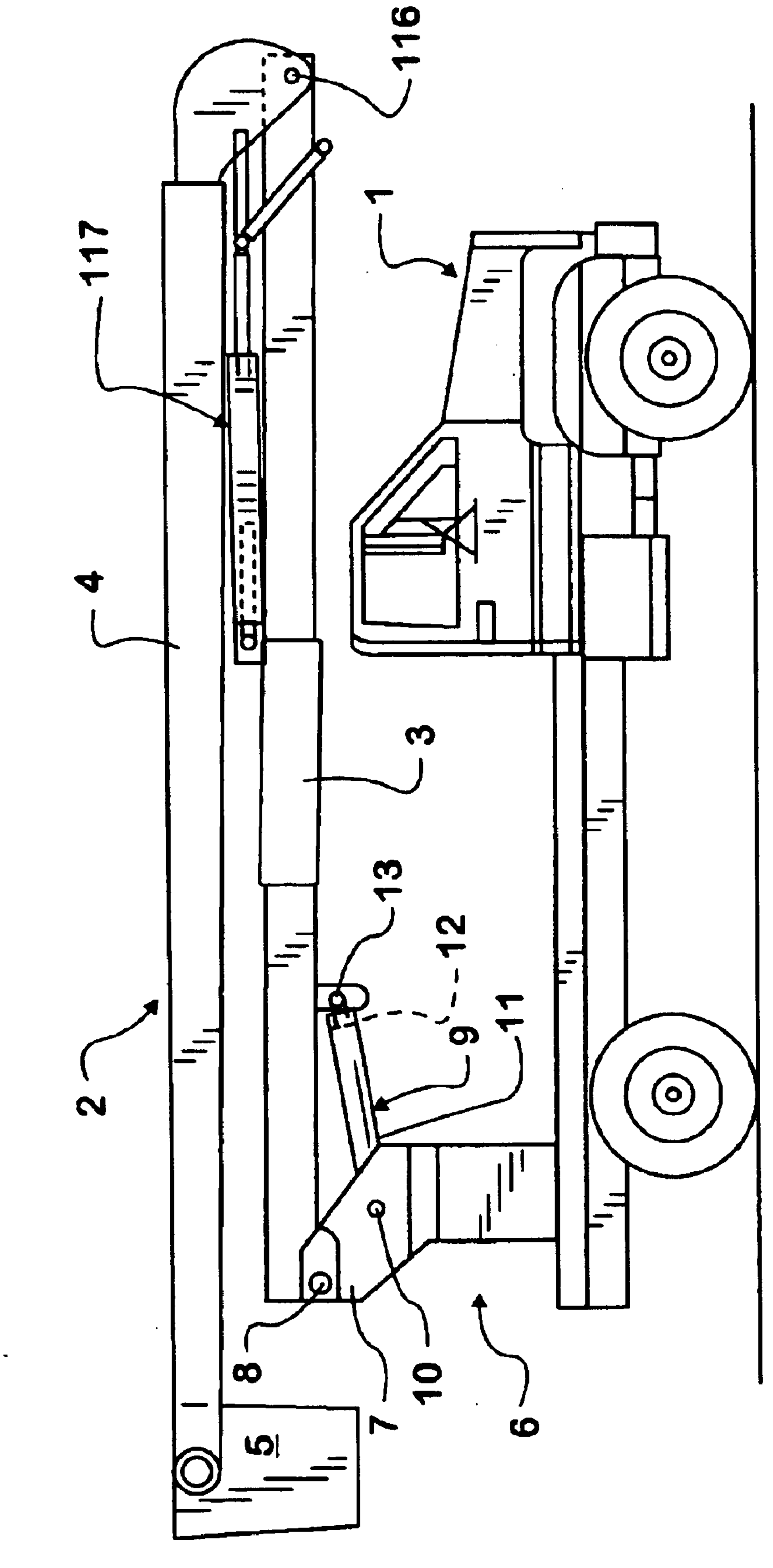
FIG. 1 PRIOR ART
FIG. 1 is a simplified illustration of a truck mounted aerial lift assembly for locating an operator in various raised positions.

Referring to the drawings, and particularly to FIG. 1, an example of a mobile aerial lift unit is illustrated in simplified presentation for clarity of illustration. The mobile aerial lift apparatus includes a truck: 1 with an aerial lift unit 2 mounted to the bed thereof. The aerial lift unit 2 includes a lower boom 3 and an upper boom 4 pivotally interconnected to each other and to the truck bed through support 6 and rotatable support bracket 7. A basket 5 is shown secured to the outer end of, the upper boom 4 within which the operating personnel are located during the lifting to and locating within a selected work area in accordance with known practice. Basket 5 is typically pivotally attached to the out end of the boom 4 to maintain a horizontal (level) orientation at all times. The aerial lift unit is mounted to the truck bed through support 6. A rotatable support bracket 7 is secured to the support 6 and projects upwardly. The lower boom 3 is pivotally connected as at pivot 8, to the rotatable support bracket 7. A lifting lower boom cylinder unit 9 is interconnected between bracket 7 and the lower boom 3. In the illustrated embodiment, a pivot connection 10 connects the lower boom cylinder 11 of unit 9 to the bracket 7. A cylinder rod 12 extends from the cylinder 11 and is pivotally connected to the boom 3 through a pivot 13. Lower boom cylinder unit 9 is connected to either of two supplies of a suitable pressurized hydraulic fluid, to lift and lower the assembly as desired.

The outer end of the lower boom 3 is interconnected to the lower and pivot end of the upper boom 4. A pivot 116 interconnects the outer end of the lower boom 3 to the pivot end of upper boom. An upper boom/compensating cylinder unit or assembly 117 is connected between the lower boom 3 and the upper boom for pivoting the upper boom about pivot 116 for positioning of the upper boom relative to the lower boom. The upper boom/compensating cylinder unit 117 is constructed to permit independent movement of the upper boom 4 relative to lower boom 3 and to provide a compensating motion between the booms to maintain the upper boom raising with the lower boom and is similarly connected to the sources of pressurized hydraulic fluid. Conventionally, aerial lift unit 2 requires positive hydraulic pressure to support operation of lower boom cylinder 11 or the upper boom cylinder 117 for lifting or lowering.

Figure 2:
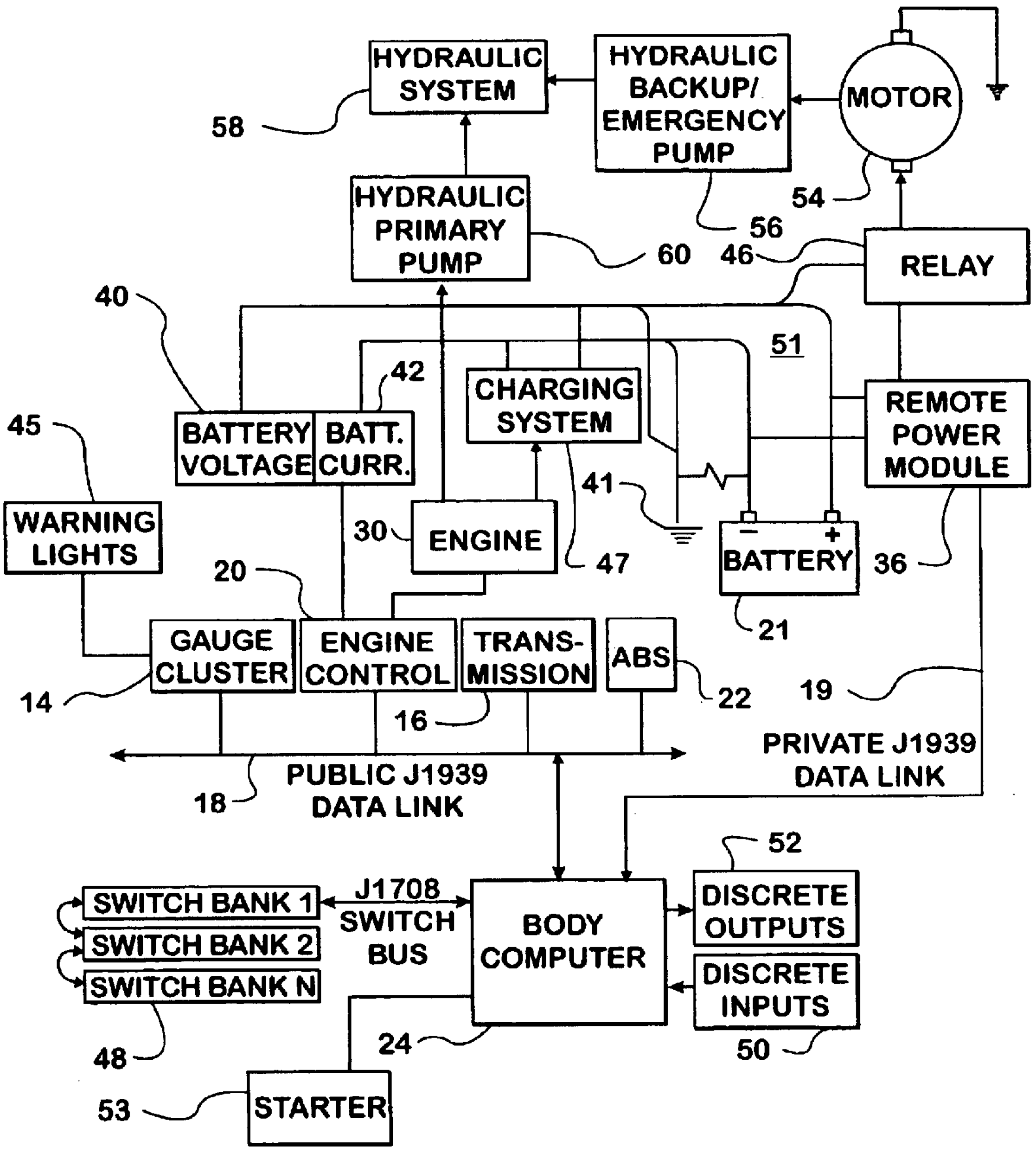
FIG. 2 is a high level schematic of a vehicle electrical and hydraulic control system incorporating the invention for the truck of FIG. 1.

FIG. 2 is a block diagram schematic illustrating electronic control of truck 1, based on a controller area network technology and a body controller/computer 24. Collectively, bus/data link 18 and the various nodes attached thereto form a public controller area network (CAN) conforming to the SAE J1939 standard. A second data link 19 also conforms to the SAE J1939 standard but is used for specialized signals relating to vehicle manufacturer specific accessories. Controller area networks are networks which do not have destination addresses for nodes attached to the networks, but rather provide for transmission of data in packets, identified as to the source, message type and priority. The nodes are programmed as to whether to respond to a packet based on one or more of the three identifiers. Many message types are predefined by the SAE J1939 standard. However, the SAE J1939 standard allows the definition of proprietary messages which conform in structure to the standard.

Active vehicle components are typically controlled by one of a group of autonomous, vocational controllers. The vocational controllers include a gauge cluster controller 14, an engine controller 20, a transmission controller 16, and an antilock brake system (ABS) controller 22. These controllers have publicly defined message types and are coupled to one another and with body controller/computer 24 by serial data bus 18. The autonomous controllers communicating over serial data bus 18 include local data processing and programming and are typically supplied by the manufacturer of the controlled component. For each autonomous controller there is a defined set of variables used for communications between the autonomous controller and other data processing components coupled to the network. A body of warning lights 45, under the direct control of gauge controller 14, may be assigned to respond to as programmed into body controller 24. This includes assigning a warning light to be activated upon a failure indication from remote power module 36. Body controller 24 is programmed in certain circumstances to translate signals from one network to the other.

Remote power module (RPM) 36 is programmed to respond to body computer 24 commands relating to systems, typically electrical accessories, located on truck 1. In the present, preferred embodiment, RPM 36 is used to trip a relay 46 used to power a direct current motor 48 from the vehicle's battery 21. Control of an RPM 36 is then implemented in the body controller 24 and communicated to the RPM over a private data link 19. Remote power module 36 includes minimal processing power and operates essentially as a slave device to body computer 24. RPM 36 can be made independent.

The preferred application of the present invention is to monitor the condition of, and to exercise, an electrical motor 54 which provides a power to a back up/emergency pump 56 which in turn provides pressurized hydraulic fluid to an hydraulic system 58 such as may be used to lift and lower aerial lift unit 2. The primary system for energizing hydraulic system 58 is primary hydraulic pump 60, driven by engine 30. Should engine 30 fail, for example as a result of running out of fuel, stranding a suspended worker in an elevated basket 5, the vehicle's battery power may be used to power motor 54 and provide hydraulic drive fluid under pressure from pump 56 to hydraulic system 58 allowing the basket to be lowered. Electrical power for vehicle 11, and for the motor supported by RPM 36, can be supplied by one or more lead acid batteries 21, or by an alternator, which is part of charging system 47. Electrical power system 51 is supplied from batteries 21 upon moving a key switch (starter 53) from an off position to an accessory or on position, without cranking the vehicle engine 30, or from charging system 47 when the engine is running and driving the charging system 47.

The preferred application of the present invention is to monitor the condition of, and to exercise, an electrical motor 54 which provides a power source to a back up/emergency pump 56 which in turn provides pressurized hydraulic fluid to an hydraulic system 58 such as may be used to lift and lower aerial lift unit 2. The primary system for energizing hydraulic system 58 is primary hydraulic pump 60, driven by engine 30. Should engine 30 fall, for example as a result of running out of fuel, stranding a suspended worker in an elevated basket 5, the vehicle's battery power may be used to power motor 54 and provide hydraulic drive fluid under pressure from pump 56 hydraulic system 58 allowing the basket to be lowered. Electrical power for vehicle 11, and for the motor supported by RPM 36, can be supplied by one or more lead acid batteries 21, or by an alternator, which is part of charging system 47. Electrical power system 51 is supplied from batteries 21 upon moving a key switch (starter 53 ) from an off position to an accessory or on position, without cranking the vehicle engine 30, or from charging system 47 when the engine is running and driving the charging system 47.

Figure 3:
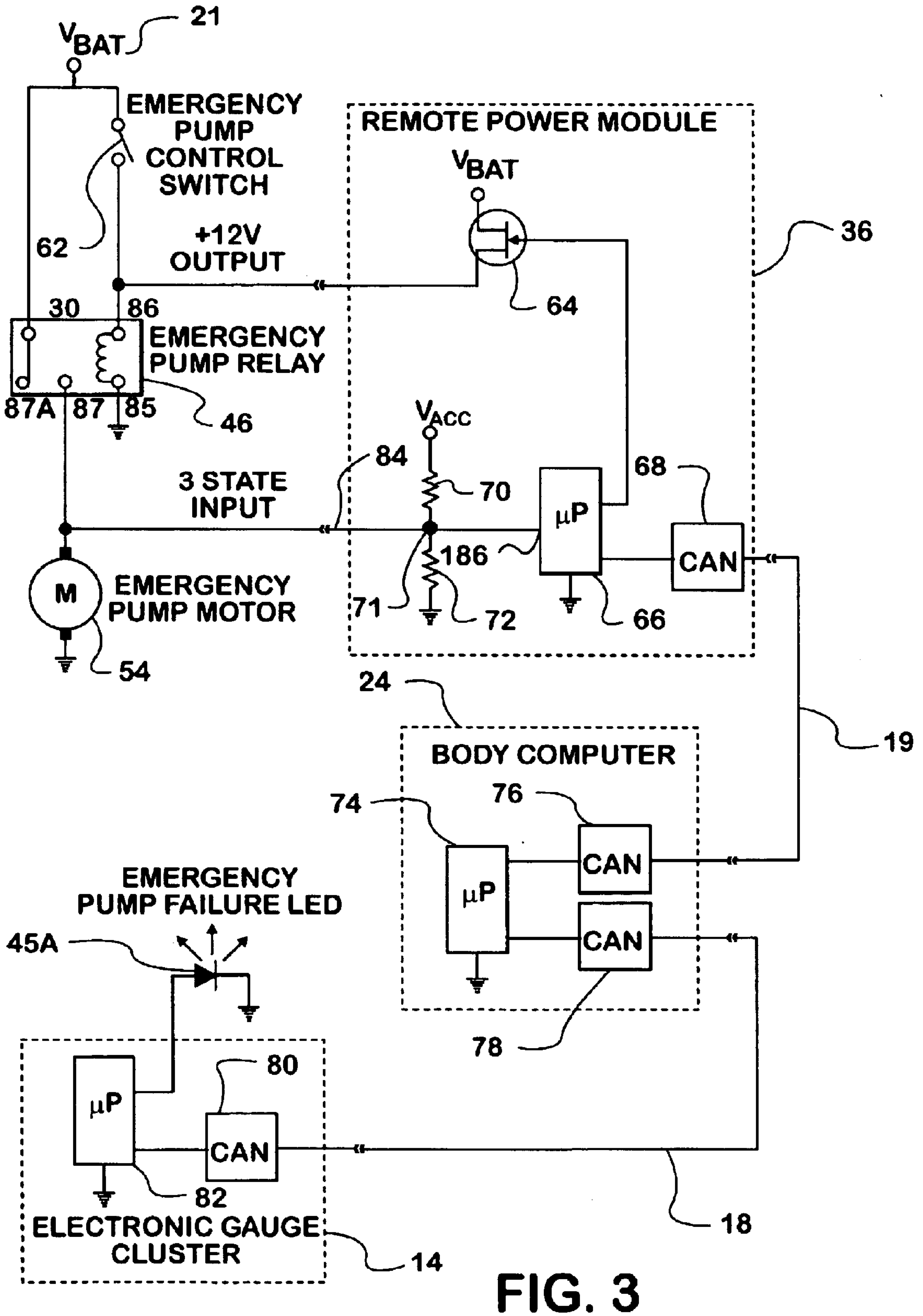
FIG. 3 is a schematic of a remote power module and an emergency pump motor energization relay used in a preferred embodiment of the invention.

Referring to FIG. 3, a remote power module 36 and its application to providing condition monitoring and exercising of an emergency electrical motor 54 is illustrated in greater detail. Remote power module 36 comprises a CAN transceiver circuit 68 and a microcontroller 66. Microcontroller 66 controls the switching state of a plurality of FET switches, one of which (FET switch 64) is shown, which may be used to provide 12 volt control signals on an output port. FET 64 cannot handle sufficient current to drive motor 54, so the FET is used instead to control the switching of a pump energization relay 46. The gate of FET switch 64 is controlled by microcontroller 66 and the output of FET switch 64 is coupled to a DIN 86 input of relay 46. RPM 36 has a 3 state input 84 coupled to one terminal of motor 54. Input 84 corresponds to node 71, the midpoint of a voltage divider circuit formed by resistors 70 and 72. Microcontroller 66 is coupled by an input terminal 186 to node 71 between resistors 70 and 72, which have relatively high resistances. Microcontroller 66 monitors the voltage at node 71 which provides an indication of the states of motor 54 brushes. Resistor 70 is connected between node 71 and an external source of accessory voltage suitable for establishing a first logic voltage level on, node 71 for RPM 36. If motor 54 is not running, the voltage on node 71 will be pulled to ground by a short circuit drop through the (non-rotating) motor to ground. Insufficient current is supplied through resistor 70 to overcome the inertia of motor 54, with the result that the motor does not rotate.. If the brush to commutator contacts are good, the motor will exhibit a negligible resistance. The current drawn through resistor 70 is a negligible drain on vehicle battery power. When motor 54 is not running microcontroller 66 should see a zero voltage on node 71. If the brushes or commutators of motor 54 are corroded and not conductive to electricity, the voltage on node 71 rises to a six volt drop across resistor 72 to ground, which is detected by microcontroller 66 and reported over data link 19 to body computer 24 using CAN controllers 68 and 76. Microcontroller 74 in body computer 24 interprets a six volt voltage on motor 54 as a failure indication, and instructs electronic gauge controller 14 over the public data link 18 using CAN controllers,78 and 80 to instruct microcontroller 82 to illuminate a light 45A designated to serve as a failure indicator.

Emergency pump motor 54 is normally energized by closure of a hard wired emergency pump control switch 62, which in turn applies 12 volts to the DIN 86 input of relay 46, closing the relay to close, and the motor to be energized directly from battery 21. Emergency pump relay is alternatively closed by sourcing the 12 volt control signal for DIN 86 from FET 64. This is effected by microcontroller 66 under instruction from microcontroller 74. In effect body computer 24 and remote power module 36 combine to provide a relay controller and motor input terminal voltage sensor. Energization of direct current motor 54 is done periodically and briefly to exercise motor 54. This helps keep brushes and commutator contacts clean and helps prevent bearings from seizing. When relay 46 is closed, the voltage on node 71 should rise to 12 volts, allowing for a momentary drop in battery voltage when the load of turning motor 54 on is first imposed. The voltages occurring on node 71 are reported by microcontroller 66 to microcontroller 74, and if they do not track expected values, microcontroller 74 issues the appropriate instruction to the electronic gauge cluster 14 to illuminate failure LED (light) 45A. Failure of microcontroller 66 to see a rise in voltage or three state input 84 indicates failure, as may be associated with seized bearings.

Figure 4:
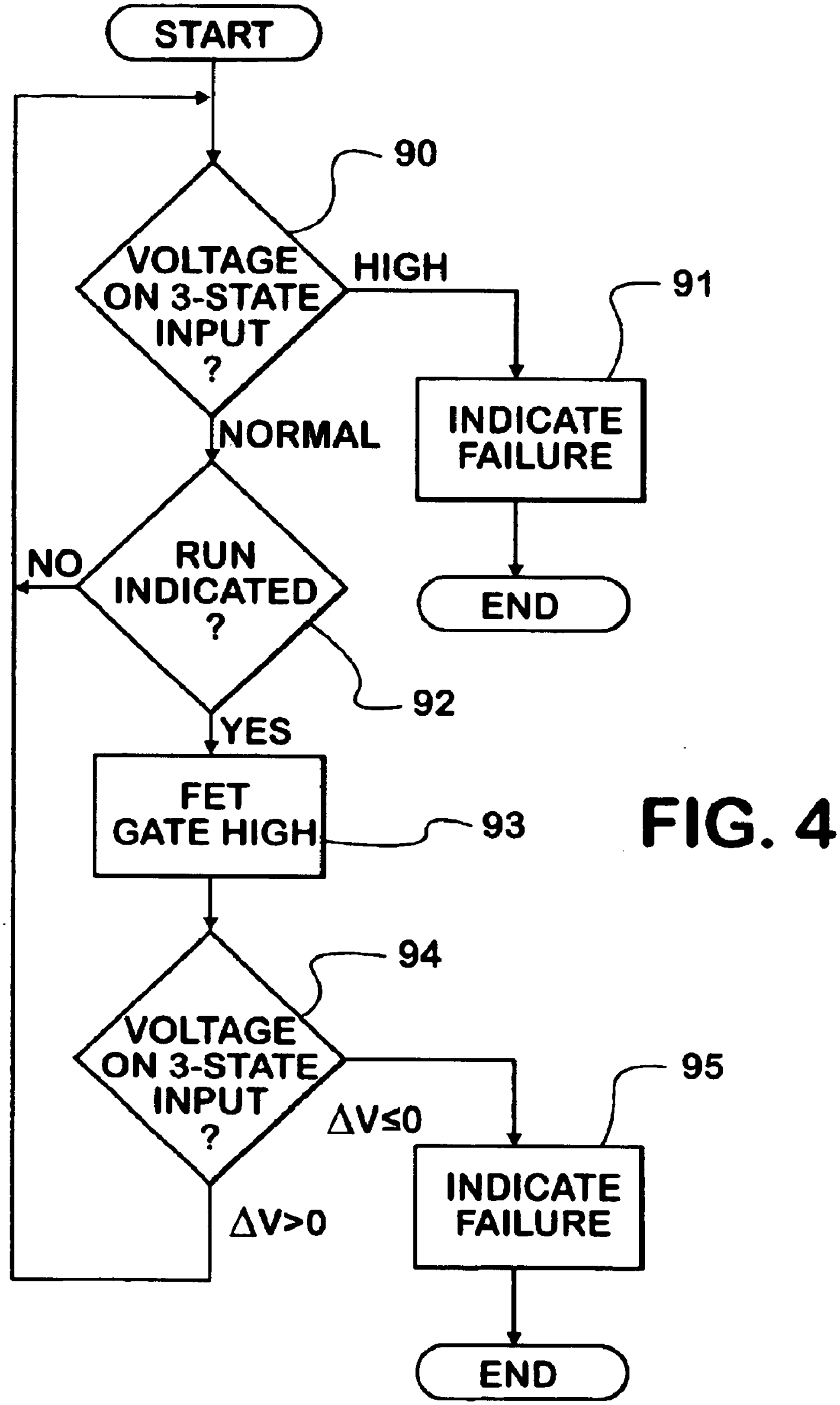
FIG. 4 is a flow chart of a program executed by a vehicle body controller to implement the invention.

Referring to FIG. 4, a flow chart illustrates the tests executed by microcontroller 74 for monitoring motor 54. First, with the initial condition that motor 54 is not energized, the voltage on the 3 state input is read and compared to nominal values at step 90. If the voltage is high, that is in the range of 6 volts, the program executes step 91 and instructs the gauge controller to illuminate a failure indicator light. If the voltage level is nominal, that is close to zero volts, it is determined if the time is appropriate to exercise (run) the motor. If not, the program loops back to sample the voltage level appearing on 3 state input 84 (after an appropriate delay). If yes, a gate control signal is applied to FET 64 (step 93) for a brief period of time to briefly run motor 54. Again the voltage appearing on the 3 state input is monitored and compared to expected values (step 94). If the voltage fails to increase, typically to about the range of 12 volts, a failure is indicated and step 95 is executed to generate an instruction to indicate failure. If voltage does rise, operation is likely nominal and the program loops back to begin again.

The invention provides for monitoring and maintaining a brush DC motor. By applying a low power, operating voltage signal to the motor, problems with the brushes and commutators may be detected and indicated when the blocked rotor, short circuit path through the motor is interrupted and the trickle current supported by the voltage source is interrupted. A back up relay activation circuit allows the motor to be periodically exercised to prevent seizure of the motor bearings.

While the invention is shown in only one of its forms, it is not thus limited but is susceptible to various changes and modifications without departing from the spirit and scope of the invention.

What is claimed is:

1. Apparatus comprising:

an hydraulic system;

a primary pressurization pump connected to the hydraulic system;

a backup pressurization pump connected to the hydraulic system;

a direct current power supply;

a direct current motor having an input terminal;

the direct current motor being coupled as a power source to the backup pressurization pump;

a relay having a control input, the relay being connected between the direct current power supply and the input terminal for the direct current motor;

a manually actuable switch connected between the direct current power supply and the control input for the relay; and a relay controller coupled to the control input for the relay, the relay controller being adapted to provide periodically a control signal to the control input for closing and reopening the relay momentarily to energize the direct current motor.

2. Apparatus as set forth in claim 1, the relay controller further comprising:

a high impedance power source connected by an output to the input terminal for the direct current motor;

means for sensing the voltage on the input terminal of the direct current motor and for indicating failure of the motor as a function in the voltage levels thereon.

3. Apparatus as set forth in claim 2, the relay controller further comprising:

a switching transistor having an output connected to the control terminal of the relay; and microcontroller means having an output connected to apply a gate control signal to a gate of the switching transistor and a voltage level sensitive input coupled to the input terminal of the direct current motor and the output from the high impedance power source, the microcontroller being responsive during periods when the relay is open to detection of a first elevated voltage level on the input terminal for indicating failure and being further responsive during periods when the relay is closed to a null voltage on the input terminal of the direct current motor for indicating failure.

4. Apparatus as set forth in claim 3, the microcontroller means further comprising:

a non-programmable controller having an output for providing the gate control signal and the voltage level detection input;

a programmable controller;

a network date link between the non-programmable controller and the programmable controller; and the programmable controller being programmed to initiate periodic generation of the gate control signal by the non-programmable controller and to initiate periodic samples of the voltage level on the voltage level detection input.

5. Apparatus as set forth in claim 4, further comprising:

a controller area network including the network data link.

6. A condition monitoring and exercise apparatus for a direct current motor coupled by a relay to a power supply, the relay having a control input and an output coupled to the direct current motor, the apparatus comprising:

a hard switch connected between the control input of the relay and the power supply;

a solid state switch having a gate and connected by an output to the relay control input;

a voltage divider network connected between the power supply and ground with an intermediate output coupled to a power output from the relay and the direct current motor;

an actuator connected to the gate for the solid state switch generating periodic, momentary gate actuation signals; and a voltage level responsive fault indicator coupled to the intermediate output of the voltage divider network.

7. A condition monitoring and exercise apparatus as set forth in claim 6, further comprising:

controller means having a gate control output connected to the gate for the solid state switch and a voltage level sensing input connected to the output for the voltage divider network.

8. A condition monitoring and exercise apparatus as set forth in claim 7, further comprising:

the controller means including programming to associate certain voltage levels detected on the output for the voltage divider network with a failure of the direct current motor, including, when the gate control signal is low, a first elevated voltage level, and when the gate control signal is high, a null voltage level.

9. A condition monitoring and exercise apparatus as set forth in claim 8, further comprising:

the controller means including a first controller having the gate control output and voltage sensing level input, a programmable controller for receiving the programming, and a controller area network incorporating the first controller and the programmable controller.

10. A condition monitoring and exercise apparatus as set forth in claim 9, further comprising:

a failure indicator;

a controller coupled to the failure indicator and to the programmable controller and responsive to a failure indication from the programmable controller for activating the failure indicator.

11. A motor vehicle comprising:

an engine;

a direct current electrical power system;

a first controller area network including a remote power module;

the remote power module including a three state input and a control signal output;

a direct current motor;

a motor control switch connected by one terminal to the direct current electrical power system; and an energization relay for the direct current motor, the energization relay having an input terminal connected both to the control signal output of the remote power module and to a second terminal for the motor control switch and having a power output terminal connected to the direct current motor and to the three state input of the remote power module.

12. A motor vehicle as set forth in claim 11, further comprising:

a primary hydraulic pump driven by the engine;

an auxiliary hydraulic pump driven by the direct current motor; and an hydraulic system powered by either the primary or the auxiliary hydraulic pump.

13. A motor vehicle as set forth in claim 12, further comprising:

a body computer; and a data link connecting the body computer and the controller for communication, the controller operating under the control of the body computer and the body computer being programmed to identify readings from the three state input with failure modes of the direct current motor.

14. A motor vehicle as set forth in claim 13, further comprising:

a gauge controller;

a warning light activated by the gauge controller; and a second data link between the gauge controller and the body computer.

15. A motor vehicle as set forth in claim 14, wherein the body computer is programmed to associate certain voltage levels detected on the three state input with failure of the direct current motor, including, when the control signal is low, a first elevated voltage level, and when the control signal is high, a null voltage level.

* * * * *